United States Patent [19]

Sprangle et al.

[11] 3,958,189
[45] May 18, 1976

[54] STIMULATED COHERENT CYCLOTRON SCATTERING, MILLIMETER, AND SUBMILLIMETER WAVE GENERATOR

[75] Inventors: Phillip A. Sprangle; Victor L. Granatstein, both of Silver Spring, Md.

[73] Assignee: The United States of America as represented by the Secretary of the Navy, Washington, D.C.

[22] Filed: June 4, 1975

[21] Appl. No.: 583,729

[52] U.S. Cl. .......................... 331/94.5 PE; 330/4.3
[51] Int. Cl.² .......................................... H01S 3/09
[58] Field of Search ................................ 331/94.5

[56] References Cited
UNITED STATES PATENTS
3,822,410   7/1974   Madey ............................. 331/94.5
3,883,819   5/1975   Condit et al. ..................... 331/94.5

OTHER PUBLICATIONS
Pantell et al., Stimulated Photon-Electron Scattering, IEEE J., Quant. Elect., Vol. QE-4, No. 11, (Nov. 1968), pp. 905–907.

Primary Examiner—William L. Sikes
Attorney, Agent, or Firm—R. S. Sciascia; Arthur L. Branning; George A. Montanye

[57] ABSTRACT

An improved apparatus and technique for providing tunable high power millimeter and submillimeter radiation. A tunable source of microwave energy is coupled to an evacuated drift tube in which an intense relativistic electron beam is propagated while constrained in a magnetic field having a direction parallel to the direction of the electron beam. The microwave energy is directed in a direction opposite to the direction of the electron beam to generate millimeter or submillimeter radiation by backscattering from the intense relativistic electron beam. By tuning the frequency of the microwave energy to be mismatched by a specific amount from the electron cyclotron frequency in the rest frame of the electrons at high beam currents, a coherent scattering of microwave energy from electron bunches will produce enhanced power output of millimeter and submillimeter radiation.

10 Claims, 1 Drawing Figure

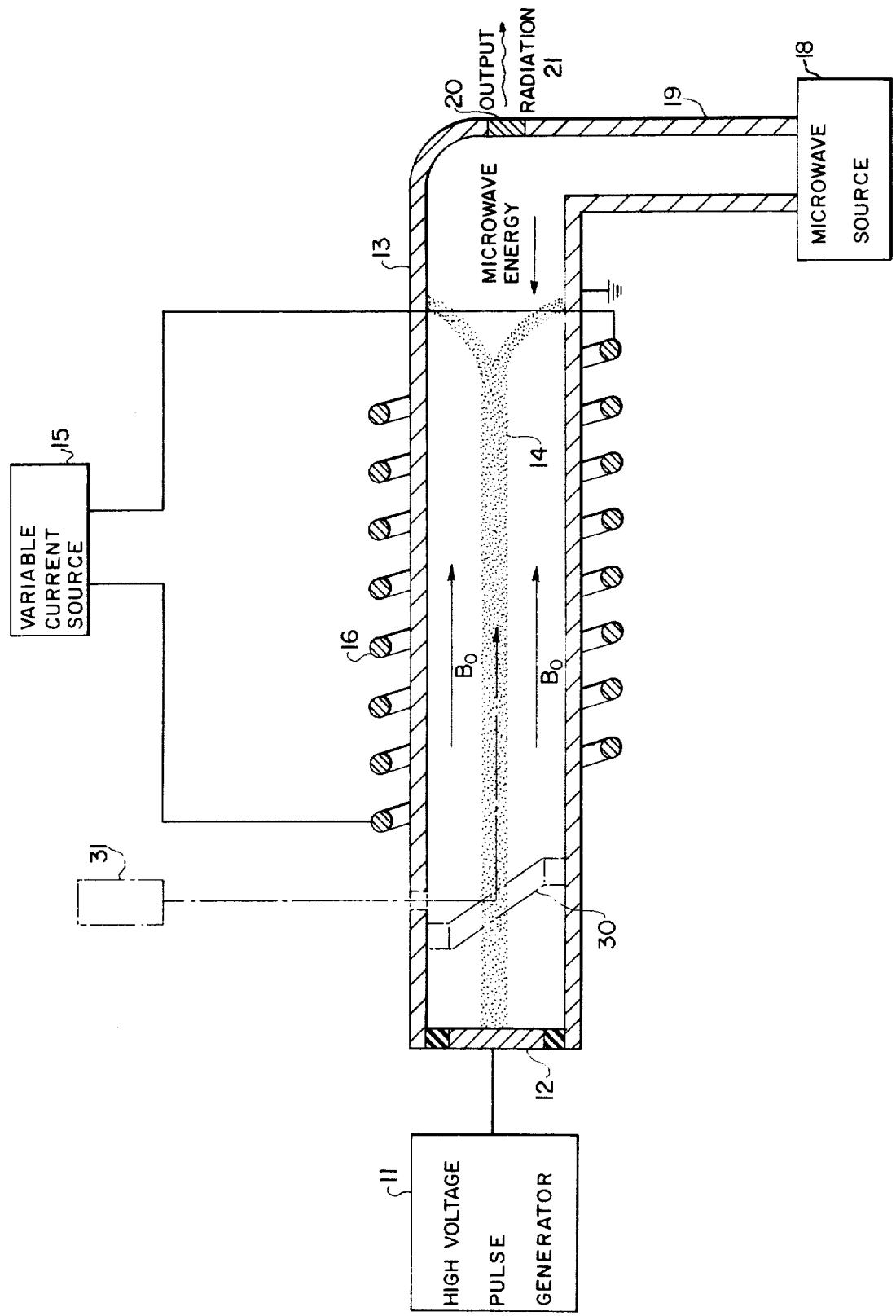

STIMULATED COHERENT CYCLOTRON SCATTERING, MILLIMETER, AND SUBMILLIMETER WAVE GENERATOR

BACKGROUND OF THE INVENTION

The present invention relates to an apparatus and technique for generating millimeter and submillimeter radiation and more particularly to an improved technique for providing high power far infrared electromagnetic radiation by coherent stimulated scattering of microwave radiation from an intense relativistic electron beam.

With the advent of laser technology, new areas were developed to provide optical techniques for generating radiation having wide applications to material analysis and communications. This expanding field of laser technology provided new sources of radiation of higher efficiency than prior sources as well as radiation at wavelengths previously unattainable. While such sources greatly expanded the practically attainable wavelengths of the electromagnetic spectrum, generation of radiation in the far infrared region of the optical spectrum in the range of 50 micrometer to 1 millimeter wavelengths still remains relatively unexplored.

Various techniques have been proposed for generating radiation in the millimeter and submillimeter regions including miniaturized microwave tube sources, quantum mechanical sources, and stimulated scattering from relativistic electron beams as exampled by U.S. Pat. No. 3,639,774. In U.S. Pat. No. 3,639,774 far infrared radiation is generated by backscattering microwaves from a relativistic electron beam having a direction along a parallel magnetic field of a magnitude chosen to make the electron cyclotron frequency approximately equal to the microwave frequency. Coherent radiation at far infrared wavelengths is then produced by resonating the backscattered radiation to produce stimulated emission of the far infrared radiation.

While such prior known techniques have had some success in generating far infrared radiation, the available power and tunability of such sources limit their potential application and effective use. In particular, the backscattering techniques have utilized relativistic electron beams having currents on the order of milliamps produced from thermionic emitting cathodes or similar structures producing low power output and narrowband radiation. It has been found that when using low current relativistic electron beams and a microwave frequency approximately equal to the electron cyclotron frequency, the low power output radiation is produced as a result of incoherent backscattering from individual electrons of the beam. It has also been found, that if the microwave frequency iis maintained equal to the cyclotron frequency as current are increased, the microwave source will be depleted via heating of the electrons rather than producing an increase in radiation power output.

While still other techniques have been proposed to generate far infrared radiation using scattering from an electron beam, each is generally restricted to low power outputs or is limited in tunability by the specific structure utilized.

Accordingly, the present invention has been developed to overcome the specific shortcomings of the above known and similar techniques and to provide an improved apparatus and technique for generating tunable high power millimeter and submillimeter radiation.

SUMMARY OF THE INVENTION

It is therefore an object of the invention to generate far infrared radiation using an intense cold relativistic electron beam.

Another object of the invention is to generate radiation by coherent scattering of microwave radiation from electron bunches to produce high power outputs.

Still another object of the invention is to provide a technique for generating both broadband and narrowband millimeter and submillimeter radiation at high power levels.

Yet another object of the invention is to provide easily tunable radiation in the millimeter and submillimeter wavelength range.

In order to accomplish these and other objects, a plasma induced field emission cathode is used to generate an intense relativistic electron beam having a cathode voltage greater than about 1.5 MV to produce an intense relativistic electron beam having a current greater than $10^3$ amps. The intense relativistic electron beam is generated in an evacuated drift tube surrounded by a solenoid which creates a uniform magnetic field parallel to the direction of the electron beam. A microwave generator is coupled to the drift tube to introduce microwave radiation at a frequency offset from the electron cyclotron frequency in the rest frame of the electrons to produce coherent backscattering from electron bunches forming submillimeter and millimeter radiation. The scattered electromagnetic radiation can be resonated between reflective surfaces to form broadband output radiation or operated as an amplifier by introducing radiation at the desired output wavelength parallel to the electron beam to produce narrowband output radiation. The output radiation can be continuously tuned by varying the microwave frequency of the pump source or by changing the energy of the electron beam while still producing power levels of several orders of magnitude larger than prior known techniques By using an intense cold relativistic electron beam, plasmons are formed which optimize the scattering process for producing highly coherent output radiation. This process of scattering off plasmons is optimized when a specific relationship between the pump source frequency, the cyclotron frequency, and the plasma frequency is satisfied.

Other objects, advantages, and novel features of the invention will become apparent from the following detailed description when taken with the accompanying drawing wherein:

BRIEF DESCRIPTION OF THE DRAWING

The FIGURE is a schematic diagram of the tunable high power far infrared generator according to the present invention.

DETAILED DESCRIPTION OF A PREFERRED EMBODIMENT

Referring now to the drawing, a schematic diagram shows a preferred embodiment of the tunable far infrared wavelength generator according to the present invention. In the present example, a high voltage source 11 is electrically coupled to a field emission cathode to produce a high negative voltage on the cathode 12. The cathode 12 is electrically insulated from an evacuated drift tube 13 and so positioned as to generate an intense cold relativistic electron beam 14 in an axial direction along the length of drift tube 13. A variable current source 15 (constant in time during the passage of the electron beam) is connected to supply current to a solenoid 16 to produce a magnetic field of magnitude $B_o$ surrounding the beam and having a direction parallel to the direction of the electron beam 14. For purposes of the present invention, the generator source 11 could be any conventional or prior known voltage source capable of providing voltage to a field emission cathode 12 so as to produce a cold intense relativistic electron beam in tube 13 in a manner well known in the art. According to the present invention, the voltage source 11 should provide a voltage greater than 1.5 MV to produce a beam current of greater than $10^3$ amps. Such sources are generally well known and could be, for example, similar to those referred to in the article "Strong Submillimeter Radiation From Intense Relativistic Electron Beams" IEEE Transactions in Microwave Theory and Techniques, Vol. MTT-22, No. 12, Dec. 1974, Part I, pp. 1000–1005, herein incorporated by reference. The magnetic field $B_o$ can likewise be created using conventional structures to provide a wide variation in current through the solenoid 16 such that the field $B_o$ can be continuously adjusted. By way of example, the value of the field could be adjustable over a range of 4–16 kG or any other value consistent with the operation of the invention as will be subsequently described.

A continuously tunable pump microwave source 18 is coupled to a waveguide 19 and then to one end of the evacuated drift tube 13 such that microwave energy can be introduced into the drift tube in a direction opposite to the intense relativistic electron beam and collinear thereto along a selected pathlength of the beam as shown by the drawing. The drift tube can be additionally constructed by conventional techniques to constitute a resonant cavity for the pump wave source 18 in order to enhance the microwave energy available for scattering in the drift tube 13. As in prior art techniques (U.S. Pat. No. 3,639,774), the microwave radiation introduced by the source 18 into the drift tube 13 causes backscattered radiation at a frequency greater than the frequency of the microwave energy due to a Doppler shift upwards resulting from the electron beam and microwave fields propagating in antiparallel directions. The scattered radiation is then reflected between elements 12 and 20 constructed to form a resonator at the far infrared wavelengths in any well known manner. The cathode 12 can be for example an aluminum reflector designed to reflect substantially all of the scattered frequencies parallel to the beam 14 while the reflector 20 can be partially transmissive at the far infrared wavelengths to allow transmission through element 20 of a portion of the far infrared radiation wavelengths 21.

While the present example has been described with reference to a particular structure for producing radiation by back-scattering from an intense relativistic electron beam, any other structure capable of producing the same scattering could likewise be employed. By way of example, the structure described in U.S. Pat. No. 3,639,774 could be used as the generator according to the present invention by substituting a high voltage source (in lieu of Van DeGraff generator 14) to produce a cold intense relativistic electron beam having currents greater than $10^3$ amps.

The practice of the inventive technique will now be described with reference to the drawing. Similar to prior known systems, the pulse generator 11 applies voltage to the cathode 12 to generate an intense cold relativistic electron beam that propagates axially in the evacuated drift tube 13. The value of the voltage is adjusted to be greater than 1.5 MV to produce an electron beam current of greater than $10^3$ amps in which plasmons form. The magnitude of the beam current establishes the plasma frequency defined as $\omega_p$. At the same time, the magnetic field from solenoid 16 is adjusted by source 15 to produce a predetermined magnitude having a direction parallel to the generated beams while establishing the electron cyclotron frequency $\Omega_o$ at a specific value. When microwave energy (e.g. about $10^5$ watts or more) is introduced into the drift tube 13 in a direction opposite and collinear to the electron beam 14 throughout a selected beam path, photons are backscattered from the beam in the same direction as the electron beam. According to known relationships, the frequency of the backscattered radiation $\omega_s$ can be defined as $\omega_s = \gamma^2[(1+\beta^2)\omega_o + 2v_ok_o]$ where $\omega_o$ is the frequency of the microwave pump source, $\beta = v_o/c$ where $v_o$ is the electron velocity and c the speed of light, $\gamma = (1-\beta^2)^{-1/2}$, and $k_o$ is the component of wavenumber of the pump wave which is antiparallel to the beam direction.

As described in prior art techniques using low currents on the order of milliamps, scattering is produced by electron beam microwave interaction with particular significance being noted in regard to making the electron cyclotron frequency equal to the pump source microwave frequency as seen in the electron rest frame of reference. While far infrared radiation is generated by this scattering, the interaction appears to be limited to producing low power outputs due to Compton type scattering growth rates involving incoherent scattering from individual electrons. If the beam current were increased above a certain critical value, it has now been found that a stronger form of scattering is possible which involves coherent scattering from electron bunches rather than incoherent scattering from individual electrons, but which requires the microwave frequency to be mismatched from the cyclotron frequency by a specific amount in order to optimize this stronger process. When voltages above a threshold of about 1.5 MV are used to generate an intense cold relativistic electron beam at currents on the order of greater than $10^3$ amps, the pump wave source would be depleted, if maintained equal to the electron cyclotron frequency in the electron rest frame, by heating of the cold intense relativistic electron beam. Such effects prohibit the use of increased power beams according to the prior art teachings and limit the power attainable by backscattering at millimeter and submillimeter wavelengths. In contrast, it has additionally been found that by setting the electron cyclotron frequency near the frequency of the pump wave as seen in the electron rest frame, but offset by a specific amount fixed by the plasma frequency $\omega_p$, scattering growth rates greatly enhanced over the usual Compton type growth rates could be obtained for the high currents of cold intense relativistic electron beams. Using the known relationship defining the electron cyclotron frequency as $\Omega_o = qB_o/mc$ and the plasma frequency as $\omega_p = (4\pi q^2 n_o/m)^{1/2}$ where $n_o$ is the beam plasma density, $q$ is the electron charge, and m is the electron mass, the frequency at which the enhanced scattering can be obtained can be defined in the rest frame of the electron beam as $\omega_o'$ (pump wave frequency in the beam frame) $= 1/2\ \Omega_o + 1/2\ (\Omega_o^2 + 4\omega_p^2)^{1/2}$. A more detailed description of the mathematics and enhanced scattering can be found in the article "Stimulated Cyclotron Resonance Scattering and Production of Powerful Submillimeter Radiation", Applied Physics Letters, 25, 377, Oct. 1, 1974 which article is hereby incorporated by reference.

As can be seen, prior techniques failed to recognize that the frequency of the pump wave source had to be maintained at a specific mismatch or offset in order to obtain enhanced power outputs due to magnetic resonance effects. While preliminary experiments involving high current relativistic electron beams (as described in the IEEE article previously referenced) indicated that enhanced power levels were possible using a specific ripple structure and no external pump source, the technique for allowing easy tunability of the far infrared radiation at optimal power levels was unrecognized. This technique produces a coherent scattering of microwave energy off electron bunches which is tunable over a wide frequency range by varying the pump source frequency or electron beam energy while adjusting the magnetic field to provide the proper mismatch between electron cyclotron frequency and pump source frequency (pump source variation being much more precise). It should be noted that at low currents the $4\omega_p^2$ term of the equation $\omega_o'$ (pump frequency in electron rest frame) $= \frac{1}{2}\Omega_o + \frac{1}{2}\ (\Omega_o^2 + 4\omega_p^2)^{1/2}$ becomes negligible in comparison to the $\Omega_o^2$ term such that the equation substantially reduces to $\omega_o' \approx \frac{1}{2}\Omega_o + \frac{1}{2}\ (\Omega_o^2)^{1/2} \approx \Omega_o$. This is consistent with the resonance condition specified in U.S. Pat. No. 3,639,774 for a low power far infrared generator using low current electron beams where the difference between optimal scattering and scattering according to the prior art would be small. As the current increases, however, above a value of about $10^3$ amps, the $4\omega_p^2$ term significantly affects the frequency of the pump source needed to produce optimal and enhanced scattering according to the present invention, and thereby prevent pump source drain as would occur according to prior art teachings. Using the above described inventive technique operating as an oscillator, broadband tunable far infrared radiation can be produced at optimal power levels and of several orders of magnitude above prior known techniques where scattering from individual electrons accounted for the far infrared radiation. In addition, narrowband radiation centered at a particular frequency can also be generated using the present inventive technique with only slight modification to the previously described structure. Referring again to the drawing, the dotted lines indicating elements 30 and 31 are shown to describe an alternative embodiment that can be used to produce narrowband radiation. Element 31 can be a known far infrared laser having a wavelength of, for example, 500 micrometers. Inserted into the cavity 13 is a reflective surface 30 which can be an aluminum reflector electrically insulated from the tube 13 and positioned at a 45° angle to the axial direction of the tube. The aluminum reflector can be constructed to be of such thickness as to withstand damage from the electron beam under the described operating conditions while positioned to reflect radiation from laser 31 parallel to the path of the electron beam 14. At the same time window 20 can be replaced by a member substantially entirely transmissive to the radiation at the wavelength of the laser. When operated in this mode, the apparatus acts as an amplifier to produce scattered radiation at power levels greatly exceeding the power levels of the laser 31 but restricted to a very narrow bandwidth centered about the laser wavelength.

As can be seen from the above description, the present invention provides an improved apparatus and technique for providing a continuously tunable far infrared generator in the millimeter and submillimeter regions at enhanced power levels. By continuously varying the external pump wave source and adjusting the magnetic field to provide the described frequency offset, enhanced coherent scattering from electron bunches can be achieved to produce power levels of output radiation at least several orders of magnitude above magnitude known techniques that is easily tuned to different frequencies. In particular it should be noted that the prior art contemplated the use of electrons with an energy of several MeV and a current of about 1 milliamp. Thus, the beam power would be on the order of $10^3$ watts and this would be an upper boundary on the power which would be found in the output radiation. On the other hand, the present invention contemplates beam energies of several megavolts accompanied by currents between one kiloampere and a megampere. Thus, beam power would be greater than $10^9$ watts with a corresponding increase in the possible power in the output radiation. In addition, by using the presently described inventive technique, both broadband and narrowband radiation can be produced with only minimal modifications to conventional structures. These are all advantages not found in prior techniques as previously mentioned.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method of providing continuously tunable far infrared radiation at enhanced power levels comprising:

generating an intense relativistic electron beam in an evacuated drift tube propagating in a first direction;

surrounding said beam with a uniform magnetic field aligned parallel to the direction of the beam;

supplying continuously tunable microwave energy to said beam at a selected frequency to produce backscattered radiation from said beam at increased frequency over said selected frequency; and adjusting the magnitude of the magnetic field such that the electron cyclotron frequency is offset from the microwave frequency by such value as to optimize power level output of the scattered radiation through magnetic resonance effects.

2. The method of claim 1 in which the adjusting step comprises, adjusting said magnetic field magnitude so that the microwave frequency in the rest frame of the electrons $\omega_o'$ is equal to $\frac{1}{2}\Omega_o + \frac{1}{2}(\Omega_o^2 + 4\omega_p^2)^{1/2}$ where $\Omega_o$ is the electron cyclotron frequency and $\omega_p$ the plasma frequency of the electron beam.

3. The method of claim 2 wherein the generating step comprises, generating an intense relativistic electron beam having a current of at least $10^3$ amps.

4. The method of claim 3 wherein the supply step includes supplying said microwave energy at a frequency of 1 GHz to 100 GHz to cause backscattering of millimeter and submillimeter radiation.

5. The method of claim 3 further including the step of resonating said backscattered radiation to produce the emission of broadband radiation at said optimal power level outputs.

6. The method of claim 3 further including the step of introducing a beam of radiation into said drift tube at a predetermined scattered frequency parallel to and in the same direction as said electron beam to provide an amplified narrowband output of scattered radiation at said predetermined frequency.

7. The method of claim 3 wherein said supplying step comprises supplying said microwave energy in a direction opposite to and collinear to said first direction.

8. An apparatus for tunably generating increased power at far infrared wavelengths comprising:
   an evacuated drift tube;
   means for generating an intense relativistic electron beam propagating in a first direction in said drift tube;
   means for establishing a magnetic field surrounding said beam to have a magnetic field direction parallel to said beam;
   continuously variable means coupled to said drift tube for introducing microwave radiation of a selected frequency into said drift tube in a direction opposite and collinear to said first direction to produce backscattered radiation from said beam at increased frequency over said microwave frequency; and
   means coupled to said establishing means for adjusting the magnitude of the magnetic field so that the microwave frequency in the rest frame of the electrons $\omega_o'$ is equal to $\frac{1}{2}\Omega_o + \frac{1}{2}\Omega_o^2 + 4\omega_p^2)^{1/2}$ where $\Omega_o$ is the electron cyclotron frequency and $\omega_p$ the plasma frequency of the electron beam.

9. The apparatus of claim 8 further including, means for resonating the backscattered radiation to produce a broadband radiation output.

10. The apparatus of claim 8 further including, means coupled to said drift tube for introducing into said drift tube a beam of radiation at a predetermined scattered frequency parallel to and in the same direction as said beam to provide an amplified narrowband output of said scattered radiation at said predetermined frequency.

* * * * *